(12) United States Patent  
Baron et al.

(10) Patent No.: US 12,048,294 B2  
(45) Date of Patent: Jul. 30, 2024

(54) ENRICHMENT APPARATUS AND ENRICHMENT APPLICATIONS

(71) Applicant: AcuiSee, LLC, Kalamazoo, MI (US)

(72) Inventors: Scott Baron, Kalamazoo, MI (US); Jeffrey A. Jamison, Mattawan, MI (US)

(73) Assignee: AcuiSee LLC, Kalamazoo, MI (US)

( * ) Notice: Subject to any disclaimer, the term of this patent is extended or adjusted under 35 U.S.C. 154(b) by 633 days.

(21) Appl. No.: 16/601,964

(22) Filed: Oct. 15, 2019

(65) Prior Publication Data

US 2020/0037578 A1     Feb. 6, 2020

Related U.S. Application Data

(63) Continuation of application No. 15/113,175, filed as application No. PCT/US2015/012567 on Jan. 23, 2015, now abandoned.

(51) Int. Cl.
| | |
|---|---|
| *A01K 5/02* | (2006.01) |
| *A01K 1/03* | (2006.01) |
| *A01K 15/02* | (2006.01) |
| *A01K 29/00* | (2006.01) |
| *G06F 3/0488* | (2022.01) |

(52) U.S. Cl.  
CPC .............. *A01K 5/02* (2013.01); *A01K 1/031* (2013.01); *A01K 15/02* (2013.01); *A01K 15/025* (2013.01); *A01K 29/005* (2013.01); *G06F 3/0488* (2013.01)

(58) Field of Classification Search  
CPC ...... A01K 5/02; A01K 5/0275; A01K 5/0114; A01K 5/0233; A01K 29/005; A01K 15/02; A01K 15/021; A01K 15/029; A01K 1/03; A01K 1/031  
See application file for complete search history.

(56) References Cited

U.S. PATENT DOCUMENTS

| | | | |
|---|---|---|---|
| 4,400,696 A * | 8/1983 | Klingensmith | A01K 15/02 200/61.7 |
| 6,273,027 B1 | 8/2001 | Watson et al. | |
| 9,485,963 B2 | 11/2016 | Shani et al. | |
| 9,737,049 B2 | 8/2017 | Trottier et al. | |
| 10,045,512 B2 * | 8/2018 | Mainini | H04W 4/80 |

(Continued)

FOREIGN PATENT DOCUMENTS

| | | |
|---|---|---|
| CN | 103125406 | 6/2013 |
| GB | 1287304 | 8/1972 |
| WO | WO2012015483 A2 | 2/2012 |

OTHER PUBLICATIONS

ISR and Written Opinion for PCT/US2015/012567 dated Apr. 13, 2015.

*Primary Examiner* — Trinh T Nguyen  
(74) *Attorney, Agent, or Firm* — Honigman LLP; Kelly T. Murphy; Jonathan P. O'Brien (57) ABSTRACT

The present invention features a method and apparatus for enriching the environment of an animal. The apparatus presents a stimulus to an animal, and the animal may input the correct response to the stimulus into an interface. Upon a correct response the apparatus delivers a treat, indication, or combination thereof to the animal. The apparatus may increase the complexity of the stimulus with each correct response. The apparatus may also be connected to social media to track and compare the results of the animal's actions with other animals.

10 Claims, 6 Drawing Sheets

(56) References Cited

U.S. PATENT DOCUMENTS

| | | | |
|---|---|---|---|
| 10,049,278 B2 * | 8/2018 | Womble | A01K 27/009 |
| 2003/0004652 A1 * | 1/2003 | Brunner | G16H 10/60 |
| | | | 702/19 |
| 2003/0028327 A1 | 2/2003 | Brunner et al. | |
| 2006/0011144 A1 * | 1/2006 | Kates | G01S 15/86 |
| | | | 119/859 |
| 2006/0011145 A1 | 1/2006 | Kates | |
| 2007/0125307 A1 * | 6/2007 | Nardine, III | A01K 1/031 |
| | | | 119/72 |
| 2012/0077159 A1 * | 3/2012 | Araujo | G09B 7/02 |
| | | | 434/236 |
| 2012/0240863 A1 * | 9/2012 | Araujo | A01K 15/02 |
| | | | 119/51.01 |
| 2013/0233249 A1 | 9/2013 | Zhu et al. | |

* cited by examiner

ENRICHMENT APPARATUS AND ENRICHMENT APPLICATIONS

PRIORITY CLAIM

This application is a continuation of, and claims priority under 35 U.S.C. § 120 to U.S. patent application Ser. No. 15/113,175 filed Jul. 21, 2016, which is a national phase application of PCT/US2015/012567, filed on Jan. 23, 2015. This application also claims priority under 35 U.S.C. § 119(e) to U.S. Provisional Patent Application No. 61/930,619 filed on Jan. 23, 2014. The entire contents of the aforementioned applications are incorporated herein by reference.

TECHNICAL FIELD

This disclosure relates to an enrichment apparatus and enrichment applications. In particular, the enrichment apparatus provides control of software stimulus and of a peripheral device to deliver treats to animals.

BACKGROUND

The USDA requires that regulated non-human animals (esp. primates) be provided with environmental enrichment (i.e., interactive devices other than the basic caging provided). Environmental enrichment allows the subjects to participate in a range of behaviors including but not limited to foraging, climbing, and cognitively-engaging tasks. In addition to laws instituted by the USDA, a range of companion and zoo animals benefit from a range of behaviors including cognitive engagement.

Current methods to provide enrichment, particularly for primates, rely upon simple food-foraging, non-mechanical devices, such as Kong® toys filled with treats, and small shelves of indoor-outdoor 'grass' with little bits of food laced throughout. Primate Products, Inc. produces a device, the Puzzle Feeder™, which provides challenging puzzle solving tasks to obtain food held within the device. The setup of the task, cleaning, and recording activity of use are highly time consuming for the human operators. Such a system does not allow for ease of use or the tracking of behavioral health of the animals. Currently in the laboratory environment, computer stimulating or testing programs for caged animals require multiple technicians to set-up the computer systems and corresponding peripheral devices. These systems are not small, self-contained units that are easily portable by a single individual or operator. These laboratory systems require the animals to be secured into a user position or chair to maintain an interaction for extended period of time. As a result, these systems do not provide the necessary enrichment.

Similar enrichment needs and low tech solutions exist for domestic pets. There are a multitude of companion animal toys meant to enrich the lives of pets. However, they are often easily destroyed by the pet, and are prone to loss of use due to boredom. Thus, there is a need for a device that directly provides, with ease of a single human operator, behavioral enrichment to a range of non-human animals. Additionally, there is a need for a small, portable, self-contained device that can be used repeatedly by each animal and serially by multiple animals and that can track behavioral health or provide enrichment over an extended period of time. Many companion animals may also benefit from varied and complex behavioral tasks maintained by food reinforcement thereby increasing the behavioral health of the animals.

DESCRIPTION OF DRAWINGS

Like reference symbols in the various drawings indicate like elements.

DETAILED DESCRIPTION

Figure 1:
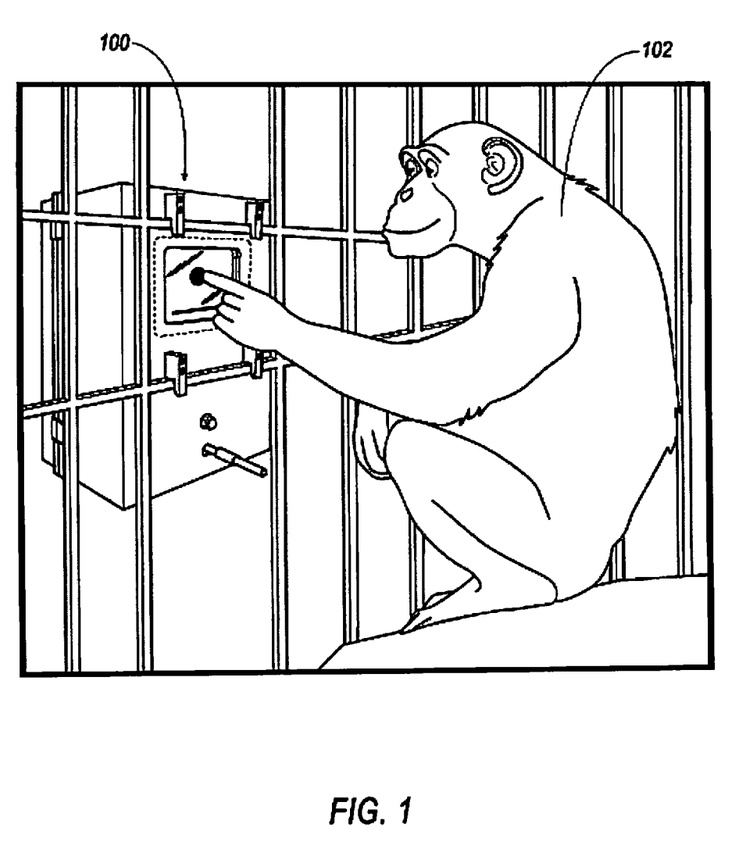
FIG. 1 is a drawing illustrating an example environment of an example enrichment apparatus.
Figure 2:
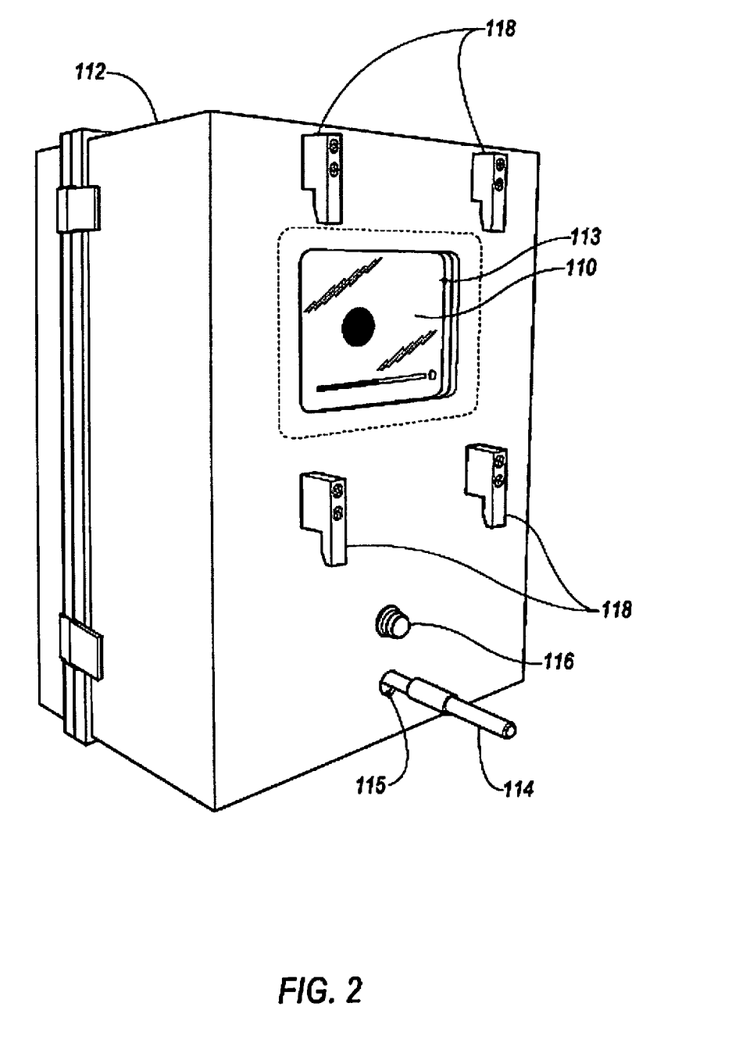
FIG. 2 is a drawing illustrating an example exterior of an enrichment apparatus.

FIGS. 1 and 2 illustrate an example of an enrichment apparatus 100. The enrichment apparatus 100 is a small, self-contained, and portable device which can be set-up for operation by a single individual. The enrichment apparatus 100 is configured to provide environmental enrichment to an animal 102. While depicted as a monkey in FIG. 1, an animal 102 may be any type of non-human animal, including but not limited to, a monkey, a gorilla, a dog, a cat, a dolphin, a whale, a seal, a bird, or any other suitable species. In an example environment, the enrichment apparatus 100 presents the animal 102 with a stimulus, such as a puzzle or game. The enrichment apparatus 100 includes a computing device, such as a tablet, that presents the stimulus to the animal 102. An operator (e.g., a keeper of the animal 102) can provide one or more parameters to the computing device such that one or more aspects of the stimuli can be altered.

When the animal 102 properly responds to the stimulus, the enrichment apparatus 100 outputs a treat to the animal 102. A treat can be any type of reward including, but not limited to, juice, fruit, processed food, solid or liquid food, and meat. In this way, the enrichment apparatus 100 may provide a cognitively challenging task that is designed to improve the behavioral health of the animal 102. The enrichment apparatus 100 may also positively reinforce the animal 102 as the animal 102 displays its cognitive skills. In some implementations, the enrichment apparatus 100 allows the animal 102 to interface with the enrichment apparatus 100 without being restrained into a user position such as a chair or within a cage. This allows for greater enrichment and behavioral engagement by the animal 102 over longer periods of time both daily and over long-term.

In some implementations, the enrichment apparatus 100 includes an interface 110, a housing 112, a treat delivery mechanism 114, an indicator 116, and one or more fasteners 118. In some implementations, the enrichment apparatus 100 with the interface 110, a treat delivery mechanism 114, and an indicator 116, is self-contained within a small housing 112 unit.

In the illustrated example, the interface 110 is a touch screen of a tablet (discussed further below). The interface 110 can present the stimulus (which can be visual, audible, olfactory or a combination thereof) to the animal. The interface 110 can further receive input from the animal 102.

While shown as a touch screen, the interface 110 can additionally or alternatively include other input means, such as a keyboard, buttons, levers, a touchpad, or a combination thereof.

Figure 3:
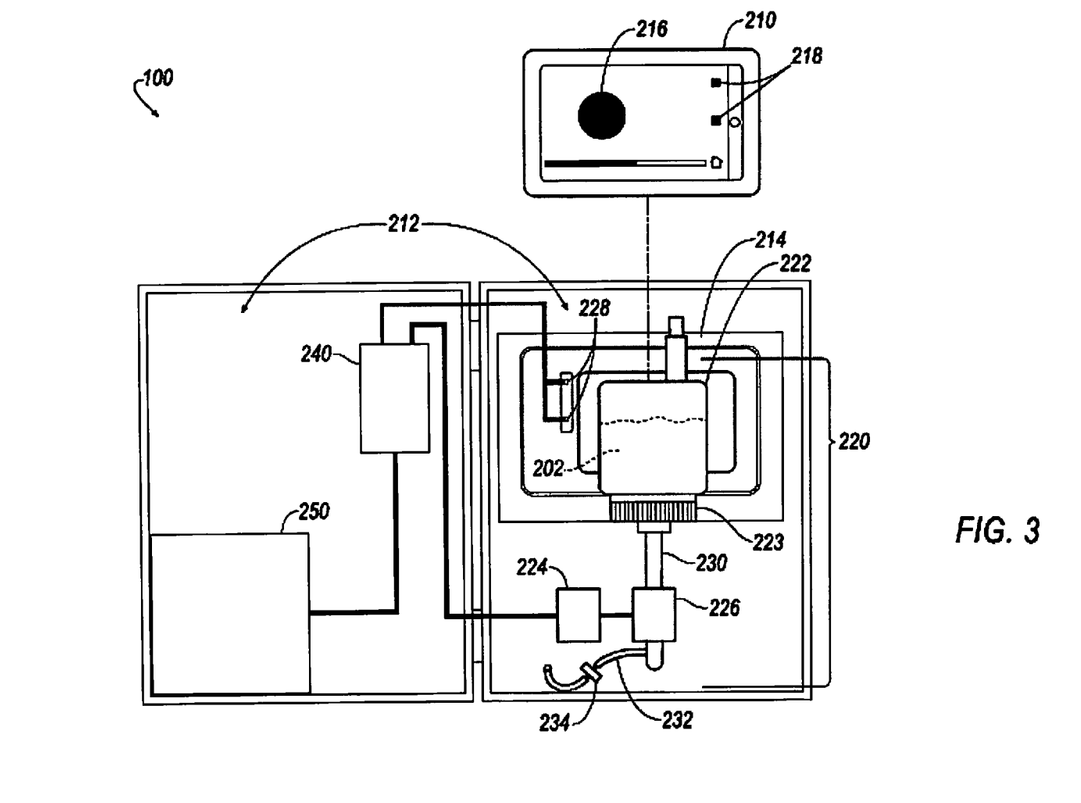
FIG. 3 is a schematic illustrating an example interior of an enrichment apparatus.
Figure 4:
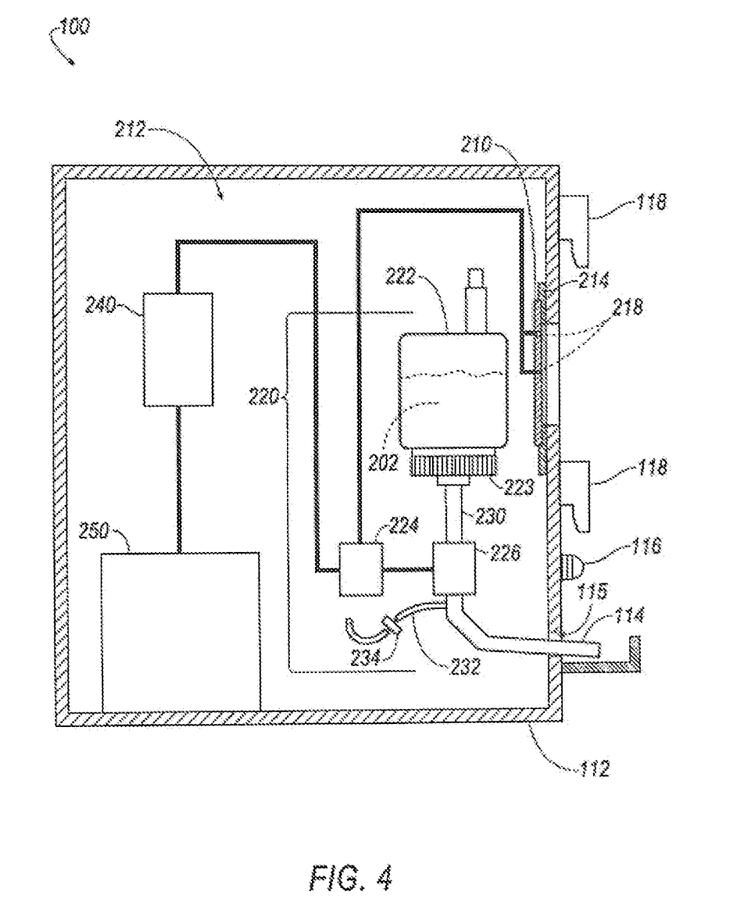
FIG. 4 is a schematic illustrating an example interior of an enrichment apparatus.

The housing 112 can be any suitable structure to house the internal components of the enrichment apparatus 100 (discussed with respect to FIGS. 3 and 4). The housing 112 can have a first aperture 113 that allows the animal 102 to access the interface 110. The housing 112 may also define a second aperture 115 through which the treat delivery mechanism 114 protrudes. In some implementations, the housing 112 can be opened, such that the interior of the apparatus 100 is accessible to a human operator. In some implementations, the housing 112 is made of light weight material for easy transport by a single operator. In additional implementations, the housing 112 is made of material that is strong enough to withstand adverse conditions, damage, rough, or careless handling by the operator or the animal 102. In other implementations, the self-contained housing 112 only provides the animal 102 access or engagement with the interface 110 and treat delivery mechanism 114.

The treat delivery mechanism 114 outputs treats to the animal 102. In the illustrated example, the treat delivery mechanism 114 is a spout that extends through the second aperture 115. When the animal 102 correctly responds to the stimulus, juice (or another liquid treat) is disposed through the spout. In implementations having solid treats, the treat delivery mechanism 114 can include a chute that deposits the treats. The enrichment apparatus 100 may alternatively include any other suitable treat delivery mechanism 114.

The fasteners 118 can be any suitable mechanisms for fastening the enrichment apparatus 100 to a structure. In the illustrated example, the fasteners 118 are hooks, whereby the hooks are rested upon bars of an enclosure (e.g., cage). The exact type of fastener depends on the type of enclosure or environment of the animal 102.

The indicator 116 can be any mechanism that provides a indication to the animal 102. For example, the indicator 116 can be a light, speaker or scent-emitting device. The indicator 116 can provide an indication when, for example, the animal 102 has successfully interacted with the enrichment apparatus 100 or when the animal 102 can use or engage the apparatus 100 again.

The exterior of the enrichment apparatus 100 may include additional components not shown or discussed. The enrichment apparatus 100 depicted in FIGS. 1 and 2 is configured for a zoo or laboratory environment. The fasteners 118 allow the enrichment apparatus 100 to be hung outside an enclosure (e.g., a cage) of the animal 102, such that the animal 102 can access the interface 110 using its snout, fingers, beak, nose, and/or toes.

In some implementations, the enrichment apparatus 100 is configured for household pets, such as dogs, cats or birds. In this way, the enrichment apparatus 100 can provide a platform for pet and owner interactions (either in person or remotely).

FIG. 3 and FIG. 4 illustrate an example interior of the enrichment apparatus 100. The enrichment apparatus 100 can include a computing device 210, a treat release system 220, a power supply 240, and a battery 250.

In implementations, the treat release system 220 includes a reservoir 222, a valve 224, a valve actuator 226, one or more sensors 228, a tube 230, a vent 232, and a filter 234. The reservoir 222 can be a receptacle that contains the treats. The reservoir 222 can include a removable cap 223. A tube 230 extends through the cap 223 and couples to the valve 224. The valve 224 couples to the treat delivery mechanism 114 (FIG. 1). The valve 224 is opened and shut by the valve actuator 226. In this way, the valve actuator 226 opens the valve 224 and treats are output through the tube 230, valve 224, and treat delivery mechanism 114 as a result of the gravitational forces acting upon the treats. In implementations where the treats are liquid, the valve 224, tube 230, or treat delivery mechanism 114 may have a vent 232 and filter 234 coupled thereto, such that an opposing airflow can aid the dispensing of the liquid treats 202. The filter 234 prevents impurities from entering the treat delivery mechanism by way of the vent 232.

The valve actuator 226 is powered by the power supply 240 (which draws power from the battery 250) and receives input from one or more sensors 228 and/or the computing device 210 directly. The sensors 228 can be light sensors and/or sound sensors. In some implementations, the computing device 210 is configured to output either a light indicator 218 or sound indicator when the animal 102 successfully responds to the stimulus. In response to a light indicator 218 or sound indicator, the sensors 228 output a signal to the valve actuator 226. The valve actuator 226 opens the valve 224 in response to the signal. In other implementations, the computing device 210 electronically couples to the valve actuator 226. In these implementations, the computing device 210 outputs a signal. The signal causes the valve actuator 226 to open the valve 224.

In the illustrated example, the computing device 210 is a tablet computer, such as a NOOK®, IPAD®, or a GALAXY NOTE®. The computing device 210 may be any other suitable computing device (e.g., laptop computer, smartphone, or micro controller). The computing device 210 may be affixed to the interior portion of the housing 212 by way of a mount 214. The mount 214 can be a form-fitted plastic mold that is sized according to the perimeter of the computing device 210. The mount 214 may have supports (not shown), such as straps or flanges that hold the computing device 210 in place. The computing device 210 can be slideably inserted onto/into the mount 214 such that the computing device 210 is held firmly in place and able to withstand the force of an animal 102 pressing thereon. In this way, an animal 102 that applies a force to the interface 110 (e.g. pushes on the touchscreen) cannot unseat the computing device 210 from the mount 214.

The computing device 210 includes one or more processors that execute machine-readable instructions corresponding to an enrichment application. In the illustrated example, the enrichment application presents the stimulus by displaying a shape 216 on the interface 110. When the animal 102 correctly responds to the stimulus, the enrichment application causes a treat or treats to be dispensed from the treat reservoir 222. In some implementations, the enrichment application displays light indicators 218 when the animal 102 correctly responds to the stimulus (e.g., presses on the shape 216). The location on the interface 110 where the light indicators 218 are displayed corresponds to the location of the sensors 228, such that light indicators 218 trigger the sensors 228. Additionally or alternatively, the enrichment application can command the computing device 210 to output a sound indicator (e.g. a sound at a particular frequency) to trigger a sound sensor 228. Alternatively, the computing device 210 may be electronically coupled to the valve actuator 226, such that when the animal 102 responds to the stimulus, the computing device 210 directly outputs the signal to the valve actuator 226.

The computing device 210 may be loaded with several enrichment applications that offer different stimuli and/or tasks to the animal 102. For example, a more complex enrichment application may be configured to display sample patterns that the animal 102 is to repeat. When the animal successfully repeats the pattern, the enrichment application can initiate delivery of a treat to the animal 102 (e.g., emitting a light indicator 218 or a signal to the valve actuator 226). In some implementations, the enrichment application can include multiple stimuli (i.e., games or puzzles) that can increase in difficulty or complexity as the animal 102 solves the less complex stimuli.

In some implementations, the enrichment applications are user-configurable. For example, a user (e.g., a keeper of the animal 102) can provide parameters relating a duration of an enrichment session, a duration of a stimulus (i.e., how much time an animal is allotted to respond to a particular stimulus), a treat dispensing duration (i.e., how long to display a light indicator 218 or to provide a signal to the valve actuator 226), how often the animal 102 can repeat the enrichment exercise, and/or the difficulty of the enrichment application.

In some implementations, the enrichment application can collect empirical data that tracks the input/progress of the animal 102. For example, if the animal 102 routinely fails at the task provided by the enrichment application, the application can track such failures. When the animal 102 begins to improve, the application can also track the progress that the animal 102 has made. In this way the enrichment application can provide enrichment to the animal 102 and collect data regarding the intellectual capabilities of the animal 102. In some implementations, the enrichment application is configured to access a local WiFi network or other external network system. This WiFi network allows for the transfer of electronic data from the devices to a data management system. In other implementations, the enrichment apparatus 100 can be configured to connect to a WiFi network, Bluetooth network or other wireless network system to allow for configuration or exchange of data generated by the enrichment apparatus 100 to a central server, computing device, or operator device (e.g. smart phone). The exchange provides an operator a convenient means to manage and coordinate multiple enrichment apparatus 100 either simultaneously, collectively, or individually.

In some implementations, the enrichment application can be configured to allow interactions between humans and the animal 102. For example, a zoo-keeper or zoo-goer can download a compatible application to a smartphone or tablet or may use a provided computing device (e.g., tablet) to provide a stimulus to the animal 102 by way of the computing device 210. The animal 102 can respond to the stimulus. If successful, the enrichment apparatus 100 rewards the animal 102 with a treat. In this way, humans and animals can interact without endangering either the animals or the humans. In some implementations, the enrichment application can be executed on the computing device 210 and a computing device accessible to the human (e.g., smartphone or tablet). In such implementations, the human and the animal 102 can play the same game or puzzle in direct comparison.

In some implementations, the enrichment application is configured to access a social media website. In these implementations, the progress of an animal 102 (e.g., a pet dog or cat) can be tracked by the owner of the animal 102 or other interested parties. Such implementations can allow pet owners to have their animals compete with one another.

Figure 5:
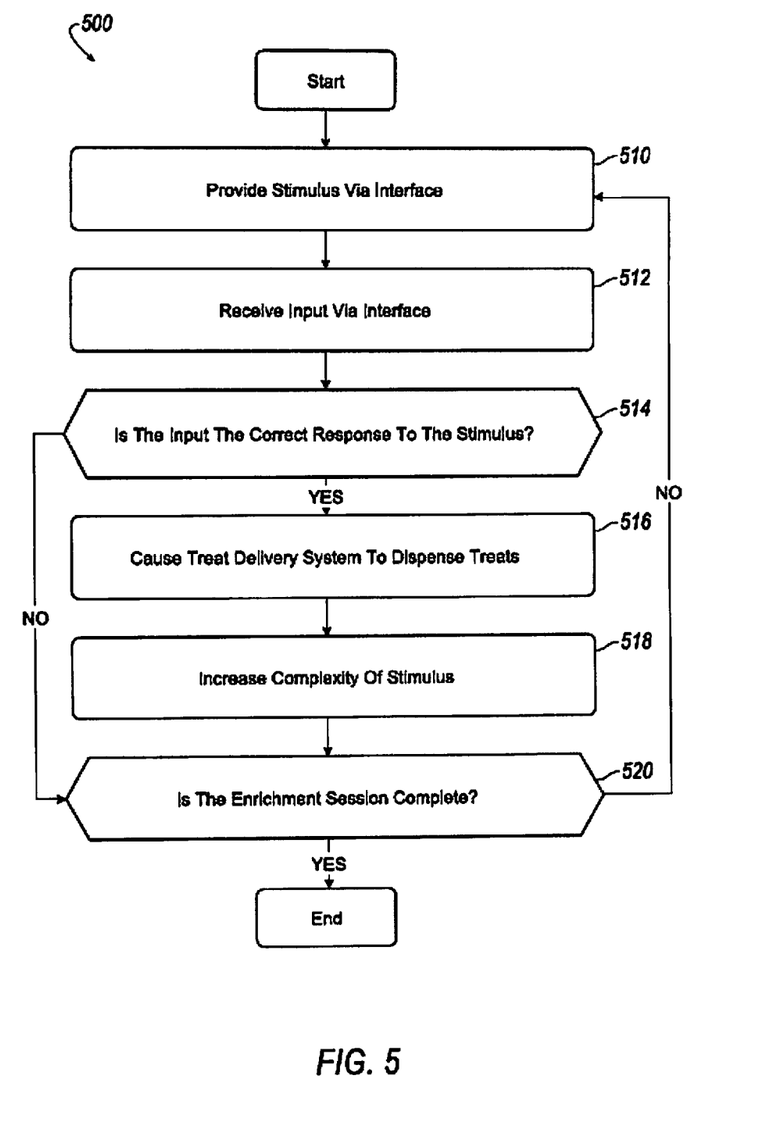
FIG. 5 is a flow chart illustrating an example set of operations that can be executed by an enrichment application.

FIG. 5 illustrates a method that can be executed by the enrichment application. At operation 510, the enrichment application provides a stimulus via the interface. As previously indicated the stimulus can be a visual stimulus and/or an audio stimulus. The stimulus may be a puzzle and/or a game. The stimulus can also vary in complexity. For instance, the stimulus that the animal 102 must repeat, and the length or complexity of the pattern can be increased to increase the stimulation of the animal 102.

At operation 512, the enrichment application receives input from the animal 102 via the interface 110. The input can be touch-based input and/or audio input. In some implementations, the enrichment application documents the input. For example, the enrichment application can store data indicating the stimulus that was presented and the response to the stimulus.

At operation 514, the enrichment application analyzes the input to determine if the input is correct. If the input is incorrect, the enrichment application determines whether the enrichment session is complete, as shown at operation 520. The duration of the enrichment session can be temporal (e.g., five minutes) or based on the number of iterations performed by the enrichment application (e.g., no more than five correct answers). If the session is complete, the enrichment application can stop executing. Otherwise, the enrichment application can present another stimulus.

If the animal 102 provides the correct input in response to the stimulus, the enrichment application can cause dispensing of the treat, as shown at operation 516. In some implementations, the enrichment application presents one or more light indicators 218 on the interface 110 that triggers the one or more sensors 228. The light indicators 218 can be arranged in a predetermined pattern, such that the light indicators 218 align with the light sensors 228. The duration of the treat dispensing can be set automatically or by a user. In some implementations, the light indicators 218 are kept on for the duration of the treat dispensing (e.g., five seconds). During the time which the light indicators 218 are displayed on the interface 110, the one or more sensors 228 output a signal to the valve actuator 226, which opens the valve 224. While the valve 224 is open, the treat delivery system 220 dispenses treats to the animal 102.

At operation 518, the enrichment application can adjust the complexity of the stimulus. The foregoing operation can be implemented to ensure that the animal 102 is being challenged and that the stimulus is not too easy to solve. The enrichment application can continue to operate in this manner until the session is complete.

The operations presented in FIG. 5 are for example only and not intended to limit the operation of the enrichment application. It is noted that some of the operations are optional and not mandatory. For instance, the enrichment application does not need to increase in complexity each time the stimulus is correctly responded to.

Figure 6:
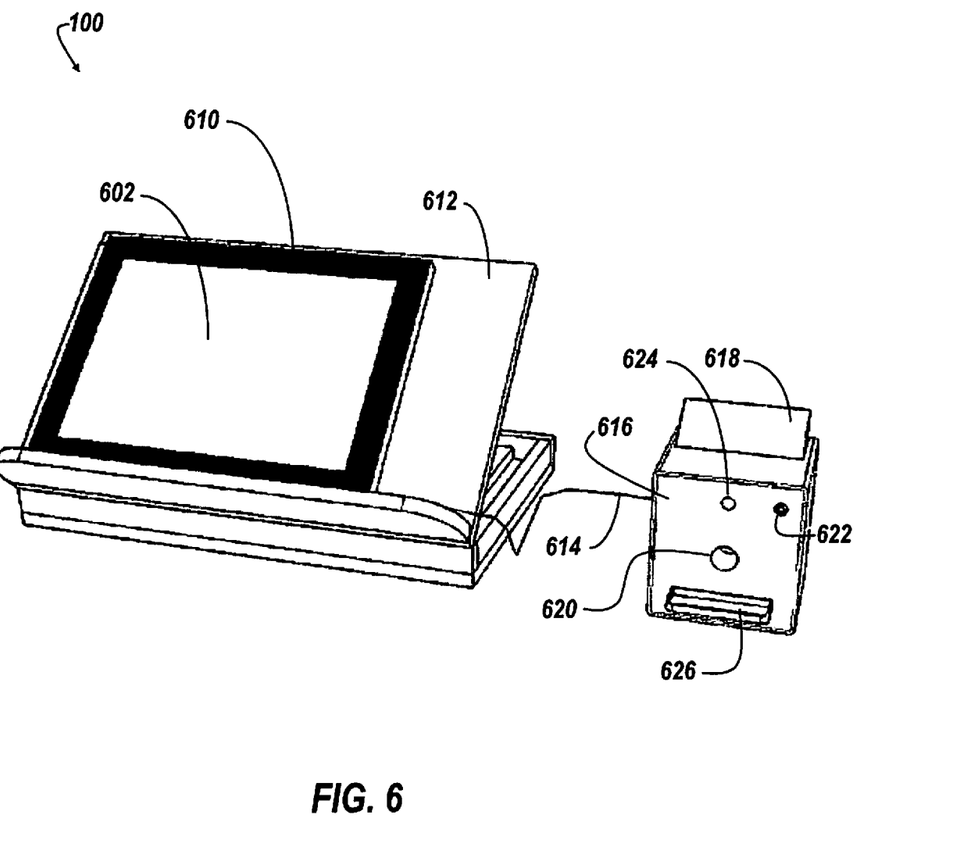
FIG. 6 is a drawing illustrating an example enrichment apparatus for a pet, domestic animal, or farm animal.

FIG. 6 illustrates an alternative configuration of the enrichment apparatus 100 for a pet, domestic animal or farm animal. The enrichment apparatus includes a computing device 610, a support structure 612, a connection 614, and a treat delivery system 616. The treat delivery system 616 includes a fill door 618, an indicator 620, a camera 622, a dispenser 624, and a tray 626.

The computing device 610 is situated on the support structure 612. The support structure 612 may include a means for securing the computing device 610, such as adhesive, straps, or flanges. The angle of the support structure 612 may also be raised or lowered to provide appropriate access to a particular user. The computing device 610 includes an interface 602. The computing device 610 is in communication with the treat delivery system 616 by way of the connection 614. The treat delivery system 616 includes the fill door 618, the indicator 620, the camera 622, the dispenser 624 and the tray 626.

In operation, the computer device 610 presents a stimulus to the pet, domestic animal or farm animal. The support structure 612 remains upright and secures the computing device 610 while the device is in use. The computing device 610 may be any suitable device, such as a tablet, smartphone or laptop computer. The computing device 610 may include a touch screen, keyboard or buttons. The computing device 610 presents a stimulus to the pet, domestic animal or farm animal, and upon a correct response to the stimulus the computing device 610 sends a signal by way of the connection 614 to the treat delivery system 616 to release a treat. The connection 614 may be a wired connection or a wireless connection.

The correct response to the stimulus also may cause the computing device 610 to send a signal to activate the indicator 620 to provide some indication to the pet, domestic animal or farm animal. The indicator may include a sound-, light-, or scent-producing device to emit a predetermined sound, light, or olfactory pattern upon a correct response to the stimulus, an incorrect response to the stimulus, or another programmable event. The correct response to the stimulus may also cause the computing device 610 to send a signal to activate or deactivate the camera 622. The camera 622 may be configured to take video or photographs. The camera 622 may be activated upon the occurrence of other events such as an incorrect response to the stimulus, the activation of the enrichment apparatus 100 or any other programmable event. The video or photographs may be sent to the computing device 610 to display or store. Alternatively, the video or photographs may be sent to an internet address for current or subsequent viewing. Once the treat delivery system 616 receives a signal to dispense a treat, a treat or treats exits the dispenser 624 and falls into the tray 626 where it is accessible to the pet, farm animal or domestic animal.

The treat delivery system 616 is accessed by a human controller through the fill door 618. The fill door 618 provides access to a treat reservoir for holding treats to be dispensed. The reservoir may hold liquid or solid treats. Treats may include pet food, water, juice, pet treats, or any other substance for ingestion. In some embodiments, the treat delivery system 616 may include a valve and a valve actuator (not shown). The valve actuator opens and closes the valve in response to a signal to release a treat. The valve may be situated such that when it is open, a treat or treats are released through the dispenser 624.

A "support structure" may be any structure used to support or position the computing device and interface. The support structure facilitates animal access to the computing device and interface. In facilitating animal access to the device and interface, the support structure secures the computing device and interface, and prevents movement while the computing device is in use. The support structure may be a housing, stand, casing, cover, table or any other structure that facilitates animal access to the computing device and interface.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), peer-to-peer networks (e.g., ad hoc peer-to-peer networks), WiFi network, Bluetooth network and other wireless network system.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed:

1. An apparatus comprising:
   a self-contained housing defining an interface aperture;
   a treat delivery system including a treat reservoir and a treat delivery mechanism disposed within the housing, the treat delivery system receiving a signal and dispensing treats in response to the signal;
   a computing device disposed within the housing, the computing device including an interface, the interface being adjacently disposed to the interface aperture and facing out of the housing;
   wherein the computing device executes an enrichment application, the enrichment application being configured to present a stimulus to an animal via the interface and to receive input from the animal via the interface without being restrained into a user position or within a cage;
   wherein the signal is provided to the treat delivery system in response to the animal correctly responding to the stimulus; and wherein the treat delivery system further includes: a valve; a valve actuator that opens and closes the valve; and the valve actuator being responsive to the signal.

2. The apparatus of claim 1, wherein:
the treat delivery system further includes one or more indicators that output an indication; and
the one or more indicators are configured to output a predetermined pattern in response to the animal correctly responding to the stimulus.

3. The apparatus of claim 2, wherein the indication is a predetermined light pattern, sound pattern, or olfactory pattern.

4. The apparatus of claim 2, wherein the value delivers a solid or liquid treat.

5. The apparatus of claim 1, wherein the enrichment application receives configuration parameters and adjusts a complexity of the stimulus based on the configuration parameters.

6. The apparatus of claim 1, wherein the enrichment application is configured to store data corresponding to responses by the animal to the presented stimulus.

7. The apparatus of claim 1, wherein the computing device is a tablet computer and the interface is a touchscreen of the tablet computer.

8. The apparatus of claim 1, wherein the computing device is a laptop computer, a smartphone, or a microcontroller.

9. The apparatus of claim 1, wherein the enrichment application is configured to increase the complexity of a next stimulus each time the animal correctly responds to a previous stimulus.

10. The apparatus of claim 1, further comprising fasteners configured to fasten the apparatus to a structure.

\* \* \* \* \*